(12) United States Patent
Hara et al.

(10) Patent No.: US 7,007,769 B2
(45) Date of Patent: Mar. 7, 2006

(54) FAIL-SAFE STEERING SYSTEM FOR A VEHICLE

(75) Inventors: Kazuo Hara, Kanagawa (JP); Hitoshi Ono, Kanagawa (JP); Kiyotaka Shitamitsu, Kanagawa (JP); Takaaki Eguchi, Yokohama (JP); Yuusuke Katou, Kanagawa (JP); Toshiaki Kasahara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/853,780

(22) Filed: May 26, 2004

(65) Prior Publication Data

US 2004/0262072 A1   Dec. 30, 2004

(30) Foreign Application Priority Data

Jun. 11, 2003   (JP)   ............................. 2003-166412

(51) Int. Cl.
*B62D 5/00*   (2006.01)

(52) U.S. Cl. ...................... 180/402; 180/444; 180/446; 701/43

(58) Field of Classification Search ................ 180/402, 180/407, 405, 446, 444; 701/43; 74/388 PS
See application file for complete search history.

(56) References Cited

U.S. PATENT DOCUMENTS

| 6,442,462 | B1 * | 8/2002 | Nishizaki et al. | ............. 701/41 |
| 6,580,989 | B1 * | 6/2003 | Husain et al. | ................ 701/41 |
| 6,655,709 | B1 * | 12/2003 | Sherwin et al. | ............. 280/402 |
| 6,938,721 | B1 * | 9/2005 | Ono et al. | ................... 180/402 |

FOREIGN PATENT DOCUMENTS

| DE | 197 39 952 A1 | 3/1999 |
| DE | 199 26 534 A1 | 12/2000 |
| JP | 2001-301639 A | 10/2001 |
| JP | 2002-225733 A | 8/2002 |

OTHER PUBLICATIONS

U.S. Appl. No. 10/853,644, filed May 26, 2004, Ono et al.

* cited by examiner

*Primary Examiner*—Tony Winner
(74) *Attorney, Agent, or Firm*—Foley & Lardner LLP

(57) ABSTRACT

A fail-safe steering system for a vehicle, which prevents movable elements of a backup mechanism from being dragged by motions of an associated one of a steering input section and a steering output section under normal operating conditions of the system, is provided. The fail-safe steering system includes two selectively engageable clutch mechanisms operatively connectable between the steering input section and the backup mechanism and between the backup mechanism and the steering output section. The fail-safe steering system also includes a mechanism for keeping the backup mechanism in the neutral condition during backup mechanism being mechanically separated under normal operating conditions of the system.

18 Claims, 9 Drawing Sheets

FAIL-SAFE STEERING SYSTEM FOR A VEHICLE

BACKGROUND OF THE INVENTION

The present invention relates generally to steering systems for vehicles, and more particularly to a steer-by-wire system with a fail-safe function, which electrically controls an operating section and a steered section mechanically separated with each other and includes a clutch mechanism for mechanically connecting the operating section and the steered section as a backup system.

Recent years, there have been disclosed various steer-by-wire systems for automotive vehicles, with which the feedback torque applied to the steering wheel and the steer angle of the steerable wheels can be arbitrarily determined. In general, a steer-by-wire system includes a mechanical backup system in a column shaft connecting a steering wheel and a steering mechanism for ensuring safety in the event of a system failure. However, with a shaft such as a column shaft for a mechanical backup system, flexibility in layout design of a cockpit, which is an advantage of steer-by-wire systems, is not sufficiently provided. In lieu thereof, a steer-by-wire system utilizing a cable mechanism as a mechanical backup system, with which a comparably higher flexibility in layout design of a cockpit is provided, is proposed. One such steer-by-wire system is disclosed in Japanese Patent Provisional Publication No. 2002-225733 published Aug. 14, 2002 (hereinafter is referred to as "JP2002-225733").

SUMMARY OF THE INVENTION

In such a steer-by-wire system, a clutch mechanism connects/disconnects an operating section including a steering wheel and a steering section including steerable wheels. In this structure, with one clutch mechanism provided for connecting and disconnecting a steering wheel and steerable wheels, movable elements, such as cables and cable reels, of a cable mechanism are consistently dragged by an associated one of the steering wheel and the steerable wheels under normal operating conditions of the steer-by-wire system is in the normal condition. This results in: (1) increasing required steering wheel torques or required steering torques by drag resistance; (2) advancing wear in cables and a cable reel by contact between the cable and the cable reel during repeated operations of winding-up and winding-off; and (3) generating operating noise by collisions or interference among the cables and the cable reel at starting winding-up and winding-off operations.

Accordingly, it is an object of the present invention to provide a steer-by-wire system, which assuredly prevents movable elements of a backup mechanism to be dragged by motions of a steering wheel or steerable wheels with a clutch mechanism disengaged.

In order to accomplish the aforementioned and other objects of the present invention, a fail-safe steering system for a vehicle comprises a first operating member rotatable with a steering input device of the vehicle, a second operating member, a first steering member, a second steering member operatively associated with steerable wheels of the vehicle, for steering the steerable wheels, a backup mechanism having a portion connected to the second operating member and a portion connected to the first steering member, for transmitting torque between the second operating member and the first steering member, a first selectively engageable clutch mechanism operatively connectable between the first operating member and the second operating member, and a second selectively engageable clutch mechanism operatively connectable between the first steering member and the second steering member.

According to another aspect of the invention, a fail-safe steering system for a vehicle comprising, first operating means for receiving and transmitting steering wheel torque, second operating means for transmitting torque, first steering means for transmitting torque, second steering means for steering steerable wheels of the vehicle, backup means for drivingly connecting the second operating means and the first steering means, first torque-transmitting means for selectively and operatively connecting and disconnecting the first operating means and the second operating means, and second torque-transmitting means for selectively and operatively connecting and disconnecting the first steering means and the second steering means.

According to a further aspect of the invention, a method of controlling a fail-safe steering system comprising a first operating member rotatable with a steering input device of the vehicle, a second operating member, a first steering member, a second steering member operatively associated with steerable wheels of the vehicle, for steering the steerable wheels, a backup mechanism having a portion connected to the second operating member and a portion connected to the first steering member, for transmitting torque between the second operating member and the first steering member, a first selectively engageable clutch mechanism operatively connectable between the first operating member and the second operating member, and a second selectively engageable clutch mechanism operatively connectable between the first steering member and the second steering member, the method comprises enabling steer-by-control control when the system is turned on, disengaging the first clutch mechanism and the second clutch mechanism after the steer-by-wire control is enabled, determining whether or not an operating state of the backup mechanism is in a predetermined neutral condition, and engaging the second clutch mechanism and steering the steerable wheels based on the operating states of the vehicle when it is determined that the operating state of the backup mechanism is within the predetermined neutral condition.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
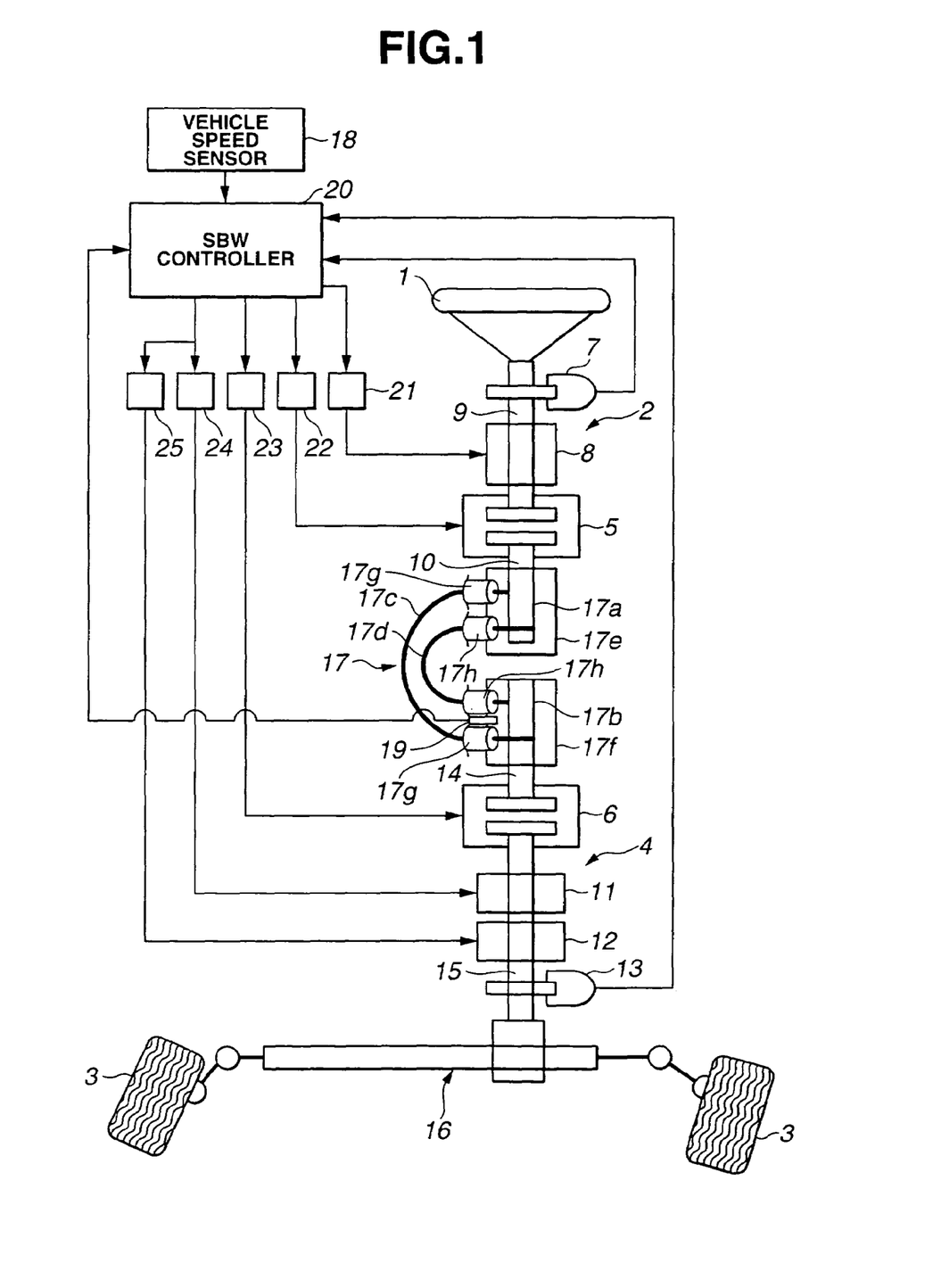
FIG. 1 is a block diagram depicting a fail-safe steer-by-wire system for a vehicle in accordance with a first embodiment of the present invention.

Referring now to FIGS. 1 through 4, there is shown a fail-safe steering system for a vehicle in accordance with a first embodiment of the present invention. The fail-safe steering system, which is a steer-by-wire (SBW) system, includes two redundant steering actuators to have a fail-safe function. As shown in FIG. 1, the SBW system includes an operating section 2, a cable mechanism 17, and a steering section 4 between a steering wheel 1 as a steering input device and steerable wheels 3, 3. Operating section 2 is operatively associated with steering wheel 1. Steering section 4 is operatively associated with steerable wheels 3, 3. A first clutch mechanism 5 is provided at midpoint of operating section 2, for selectively and mechanically connecting and disconnecting an upper part of operating section 2 and cable mechanism 17. A second clutch mechanism 6 is provided at midpoint of steering section 4, for selectively and mechanically connecting and disconnecting cable mechanism 17 and a lower part of steering section 4. The SBW system further includes sensors and controllers.

In operating section 2, a steering wheel angle sensor 7, and a feedback torque actuator 8 are arranged downward and attached to a first steering column shaft 9 as a first operating member, which is connected to steering wheel 1. First clutch mechanism 5 is intervened between first steering column shaft 9 and a second steering column shaft 10 as a second operating member. First clutch mechanism 5 is, for example, an electromagnetic clutch capable of being controlled electrically for selectively connecting and disconnecting first steering column shaft 9 and second steering column shaft 10.

In steering section 4, a first steering actuator 11, a second steering actuator 12, and a pinion angle sensor 13 are arranged downward and attached to a second pinion shaft 15 as a second steering member. Second clutch mechanism 6 is intervened between a first pinion shaft 14 as a first steering member and second pinion shaft 15. Second clutch mechanism 6 is, for example, an electromagnetic clutch capable of being controlled electrically for selectively connecting and disconnecting first pinion shaft 14 and second pinion shaft 15. A steering mechanism 16, such as a rack and pinion steering mechanism, is mechanically connected to the lower end of second pinion shaft 15. Steerable wheels 3, 3 are connected to the ends of steering mechanism 16, so that steerable wheels 3, 3 are steered by linear motions of the rack of steering mechanism 16.

Figure 2:
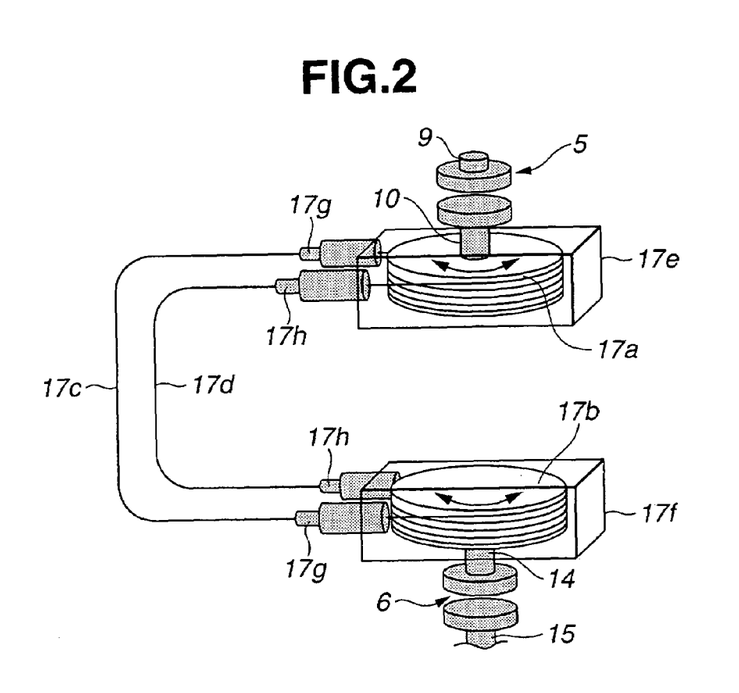
FIG. 2 is a perspective view of a cable mechanism of the fail-safe steer-by-wire system in accordance with the first embodiment.
Figure 3A:
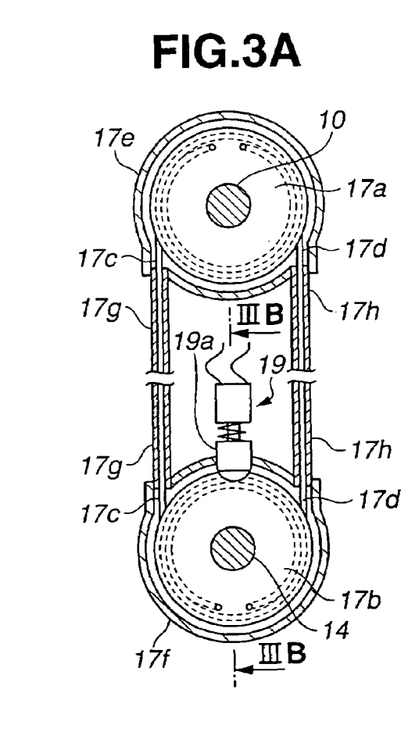
FIG. 3A is a cross-sectional view of the cable mechanism and a contact displacement sensor in accordance with the first embodiment.
Figure 3B:
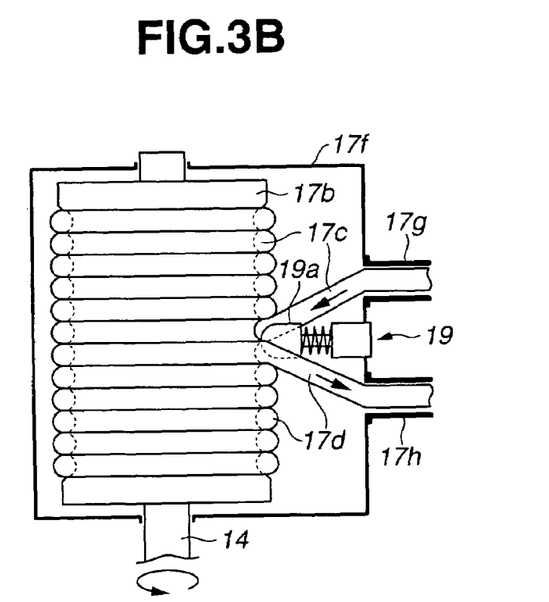
FIG. 3B is an enlarged cross-sectional view taken along the plane indicated by the line IIIB—IIIB in FIG. 3A.

Referring now to FIGS. 2 through 3B in addition to FIG. 1, there is shown cable mechanism 17 in detail. Cable mechanism 17 as a backup mechanism, which is provided between operating section 2 and steering section 4, mechanically connects operating section 2 and steering section 4 with first clutch mechanism 5 and second clutch mechanism 6 both engaged, serving for a backup mechanism. Cable mechanism 17 includes a first cable reel 17a provided at the lower end of second steering column shaft 10, second cable reel 17b provided at the upper end of first pinion shaft 14, and two cables 17c and 17d each wound on cable reels 17a and 17b. First cable 17c is wound counter-clockwise on first cable reel 17a and clockwise on second cable reel 17b from the top view. On the other hand, second cable 17d is wound clockwise on first cable reel 17a and counter-clockwise on second cable reel 17b from the top view. Thus, cable mechanism 17 mechanically connects operating section 2 and steering section 4. First cable reel 17a, which is provided at the lower end of second steering column shaft 10, is housed in a first reel case 17e fixed with reference to the vehicle body. The ends of cables 17c and 17d are each fixed on the outer peripheral wall of first reel case 17e. Cable guides for winding up one of cables 17c and 17d and winding off the other cable at the same time is provided on the outer peripheral wall of first reel case 17e. Similarly, second cable reel 17b, which is provided at the upper end of first pinion shaft 14, is housed in a second reel case 17f fixed with reference to the vehicle body. The ends of cables 17c and 17d are each fixed on the outer peripheral wall of second reel case 17f. Cable guides for winding up one of cables 17c and 17d and winding off the other cable at the same time is provided on the outer peripheral wall of second reel case 17f. Flexible cable outer tubes 17g and 17h, into which cables 17c and 17d are inserted respectively, connect first reel case 17e and second reel case 17f. As discussed above, in cable mechanism 17, two cable reels 17a and 17b, which are provided at the lower end of second steering column shaft. 10 and the upper end of first pinion shaft 14 respectively, are mechanically connected to each other by two cables 17c and 17d, which are wound on each of cable reels 17a and 17b in different directions. With steering wheel 1 steered in one direction, steering torque is transmitted by one of cables 17c and 17d, and at the same time, feedback torque is transmitted by the other cable. Thus, steering wheel angle sensor 7 provides a function comparable with mechanical column shafts.

Cable wound states, that is, relationships between two cables 17c and 17d and cable reels 17a and 17b are detected by a contact displacement sensor 19. As shown in FIGS. 3A and 3B, contact displacement sensor 19 is provided at second reel case 17f. Contact displacement sensor 19 includes a spring-loaded follower 19a that is in contact with the outer peripheral wall of second cable reel 17b or one of the surfaces of cables 17c and 17d. When amounts of cables 17c and 17d wound on second cable reel 17b are comparable, that is, when the cable wound state is in a predetermined neutral condition where differences among amounts of two cables 17c and 17d each wound on two cable reels 17a and 17b are smaller than a predetermined length, spring-loaded follower 19a is directly in contact with the outer peripheral wall of second cable reel 17b that is not covered with the cables. On the other hand, when amounts of cables 17c and 17d wound on second cable reel 17b are different, spring-loaded follower 19a is in contact with one of the surfaces of cables 17c and 17d. The contact surfaces according to the two different cable wound states are stepped by the diameter of cables 17c and 17d. Contact displacement sensor 19 detects a cable wound state by a position of spring-loaded follower 19a, that is, by a radial displacement of a contact between the contact displacement sensor and one of the outer peripheral wall of second cable reel 17b and portions of cables 17c and 17d wound on second cable reel 17b. When the cable wound state is in the neutral condition, contact displacement sensor 19 outputs a switch ON signal. On the other hand, when the cable wound state is out of the neutral condition, contact displacement sensor 19 outputs a switch OFF signal.

A steer-by-wire controller 20, into which sensor signals are input from steering wheel angle sensor 7, pinion angle sensor 13, contact displacement sensor 19, and a vehicle speed sensor 18, controls feedback torque actuator 8 and first clutch mechanism 5 at operating section 2, and first steering actuator 11, second steering actuator 12, and second clutch mechanism 6 at steering section 4. Steer-by-wire controller 20 includes a cable wound state neutralizing section for neutralizing the cable wound state based on the detection of contact displacement sensor 19 during a steer-by-wire control, and a clutch control section for entering commands for keeping disengaging both clutch mechanisms 5 and 6 while it is determined that the SBW system functions normally and engaging both clutch mechanisms 5 and 6 when it is determined that there is a failure in the SBW system, during a steer-by-wire control. Feedback torque actuator 8, first clutch mechanism 5, second clutch mechanism 6, first steering actuator 11, second steering actuator 12 are regulated by a feedback torque actuator driving circuit 21, a first clutch driving circuit 22, a second clutch driving circuit 23, first steering actuator driving circuit 24, and a second steering actuator driving circuit 25, respectively.

Figure 4:
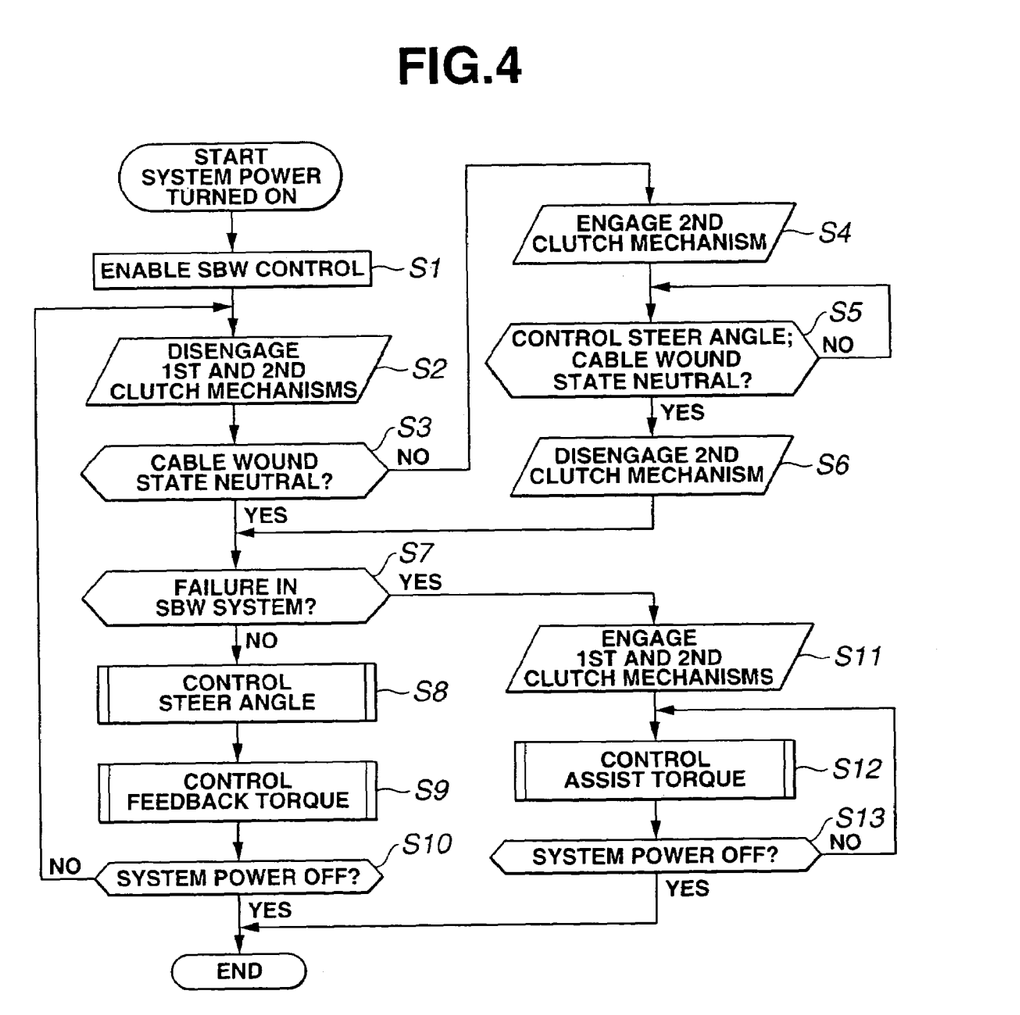
FIG. 4 is a flow chart depicting process steps of a steer-by-wire control executed by a steer-by-wire controller in accordance with the first embodiment.

The following describes operations of the SBW system. Referring now to FIG. 4, there are shown process steps of a steer-by-wire control executed by steer-by-wire controller 20. At step S1, steer-by-wire controller 20 enables the SBW control to initiate when the system power is turned on. Then the routine proceeds to step S2.

At step S2, steer-by-wire controller 20 outputs a command for disengagement or an ON signal to each of first clutch mechanism 5 and second clutch mechanism 6 that are engaged before the start of the routine. In the shown embodiment, clutch mechanisms 5 and 6 are engaged by de-energizing, and disengaged by energizing.

At step S3, a check is made to determine whether or not the wound state of cables 17c and 17d is in a neutral condition based on the detection of contact displacement sensor 19. When the answer to step S3 is YES, the routine proceeds to step S7. On the other hand, when the answer to step S3 is NO, the routine proceeds to step S4.

At step S4, steer-by-wire controller 20 outputs a command for engagement or an OFF signal to second clutch mechanism 6 based on the determination in step S3 that the wound state of cables 17c and 17d is out of the neutral condition. Then the routine proceeds to step S5.

At step S5, first, with second clutch mechanism 6 engaged, steer-by-wire controller 20 controls at least one of steering actuators 11 and 12 based on driver's operations of steering wheel 1 and operating conditions of the vehicle. This results in changing the cable wound state. Then, a check is made to determine whether or not the wound state of cables 17c and 17d is in the neutral condition based on the detection of contact displacement sensor 19. When the answer to step S5 is YES, the routine proceeds to step S6. On the other hand, when the answer to step S5 is NO, step S5 is repeated until it is determined that the wound state of cables 17c and 17d is in the neutral condition.

At step S6, second clutch mechanism 6 is disengaged based on the determination in step S5 that the wound state of cables 17c and 17d is in the neutral condition. Then, the routine proceeds to step S7.

At step S7, with clutch mechanisms 5 and 6 disengaged and the wound state of cables 17c and 17d in the neutral condition, a check is made whether or not there is a failure in the SBW system based on diagnosing operations of controllers 21 through 25. When the answer to step S7 is NO, that is, when no failure is present in the system, the routine proceeds to step S8. On the other hand, when the answer to step S7 is YES, that is, when a failure is present in the system, the routine proceeds to step S11.

At step S8, steer-by-wire controller 20 controls the steer angle. First, desired steer angles are determined or calculated based on steering wheel angles and operating conditions of the vehicle. Steer-by-wire controller 20 outputs commands to first steering actuator 11 and second steering actuator 12 to regulate actual steer angles based on the desired steer angles. Then, the routine proceeds to step S9.

At step S9, steer-by-wire controller 20 controls the feedback torque. First, desired feedback torques are suitably determined or calculated based on steered conditions and operating conditions of the vehicle. Steer-by-wire controller 20 outputs commands to feedback torque actuator 8 to regulate actual feedback torques based on the desired feedback torques. Then, the routine proceeds to step S10.

At step S10, a check is made to determine whether or not the SBW system power is OFF. When the answer to step S10 is NO, that is, when the SBW system power is ON, the routine returns to step S2. On the other hand, when the answer to step S10 is YES, that is, when the SBW system power is OFF, the routine is terminated.

At step S1, following step S7 in the case that it is determined that there is a failure in the SBW system, the normal SBW control is inhibited and clutch mechanisms 5 and 6 are engaged for mechanical steering control. Then, the routine proceeds to step S12.

At step S12, steer-by-wire controller 20 controls the assist torque. First, required steering torques are estimated or calculated based on angle deviation or twisting angles between detected steering wheel angles and detected steer angles. Then, desired assist torques are suitably determined based on the required steering torques. Steer-by-wire controller 20 outputs commands to normal ones of first steering actuator 11 and second steering actuator 12 to regulate actual assist torques based on the desired assist torques. Then, the routine proceeds to step S13.

At step S13, a check is made to determine whether or not the SBW system power is OFF. When the answer to step S13 is NO, that is, when the SBW system power is ON, the routine returns to step S12. On the other hand, when the answer to step S12 is YES, that is, when the SBW system power is OFF, the routine is terminated.

The following describes actual operations under normal operating conditions of the SBW system. When the wound state of cables 17c and 17d is in the neutral condition and the SBW system is in the normal condition, the routine executes in sequence steps S1, S2, S3, S7, S8, S9, and S10. The routine repeatedly executes steps S7, S8, S9, and S10 while the system is in the normal condition and the system power is ON. Concretely, first, at step S1, steer-by-wire controller 20 enables the SBW control to initiate when the system power is turned on. At step S2, clutch mechanisms 5 and 6 are disengaged. At step S3, it is determined that the wound state of cables 17c and 17d is in the neutral condition. Then, at step S7, it is determined that there is no failure in the SBW system. After the determinations, the normal SBW control is executed. The steer angle control and the feedback torque control are repeatedly executed based on driver's operation of steering wheel 1.

Employing advantages that steering wheel 1 and steerable wheels 3, 3 are mechanically separated under normal operating conditions of the system, the SBW system allows steering steerable wheels 3, 3 at suitable overall steering ratios according to driver's operation of steering wheel 1 and operating conditions of the vehicle.

While feedback torque is produced and provided to a driver by steering resistance between steerable wheels 3, 3 and road surface with a mechanical steering system employed, no feedback torque is provided in a steer-by-wire system where a steering wheel and steerable wheels are mechanically separated, which causes uncomfortable feels of steering wheel operation. However, in the shown embodiment, similar feedback torque as in the case of a mechanical steering system is simulated and provided to a driver by feedback torque actuator 8 via steering wheel 1.

With one clutch mechanism provided for connecting and disconnecting a steering wheel and steerable wheels, movable elements, such as cables and cable reels, of a cable mechanism are consistently dragged by an associated one of the steering wheel and the steerable wheels while the SBW system is in the normal condition. This results in: increasing required steering wheel torques or required steering torques by drag resistance; advancing wear in cables and a cable reel by contact between the cable and the cable reel during repeated operations of winding-up and winding-off; and generating operating noise by collisions or interference among the cables and the cable reel at starting winding-up and winding-off operations. On the other hand, as discussed above, the SBW system includes two clutch mechanisms. Clutch mechanisms 5 and 6 are disengaged while the SBW system is in the normal condition. Thus, cable mechanism 17 is mechanically separated from both steering wheel 1 and steerable wheels 3, 3, which prevents the movable elements of cable mechanism 17 from being dragged by rotating motions of steering wheel 1 or steerable wheels 3, 3.

The following describes actual operations in the fault conditions of the SBW system. After the SBW system shifts from a normal condition to a fault condition with the wound state of cables 17c and 17d in the neutral condition and clutch mechanisms 5 and 6 disengaged, the routine executes in sequence steps S7, Sl1, S12, and S13. At step S11, clutch mechanisms 5 and 6 are engaged. At step S13, the assist control is executed. Thus, under fault conditions of the SBW system, with clutch mechanisms 5 and 6 engaged, steering torques applied to steering wheel 1 by a driver is transmitted to steerable wheels 3, 3 via a mechanical connection as a backup system including cable mechanism 17, to steer steerable wheels 3, 3. In this operation, cable mechanism 17, functioning as a low-stiffness member, is twisted by steering torque. While steering wheel angle sensor 7, pinion angle sensor 13, and at least one of steering actuators 11 and 12 are normally operating, suitable assist torques are provided for reducing driver's steering load, based on twisting angles (or angle deviations) between detected steering wheel angles and detected steer angles serving as data for estimating applied steering torques.

The following describes actual operations in the case it is determined that the cable wound state is out of the neutral condition after the system power is turned on and clutch mechanisms 5 and 6 are disengaged. The routine executes in sequence steps S1, S2, S3, S4, SS, and S6. At step S4, second clutch mechanism 6 is engaged. At step S5, controlling at least one of steering actuators 11 and 12 based on driver's operations of steering wheel 1 and operating conditions of the vehicle, and a check to determine whether or not the wound state of cables 17c and 17d is in the neutral condition are repeated. When it is determined at step 55 that the wound state of cables 17c and 17d is in the neutral condition, the routine proceeds to step S6, where second clutch mechanism 6 is disengaged. Thus, in the case the wound state of cables 17c and 17d is out of the neutral condition, second clutch mechanism 6 is disengaged after the wound state of cables 17c and 17d is regulated to the neutral condition. Accordingly, the difference between left and right maximum operable steering wheel angles during backup operations of the system is reduced with reliability.

SBW systems such as a system disclosed in JP2002-225733 employs a cable mechanism as a mechanical backup system, which allows a comparably higher flexibility in layout design of a cockpit of a vehicle. In such a SBW system, a clutch mechanism connects/disconnects an operating section connected to a steering wheel and a steering section connected to steerable wheels. In that structure, movable elements, such as cables and cable reels, of a cable mechanism are consistently dragged by an associated one of the steering wheel and the steerable wheels while the SBW system is in the normal condition. This results in: (1) increasing required steering wheel torques or required steering torques by drag resistance; (2) advancing wear in cables and a cable reel by contact between the cable and the cable reel during repeated operations of winding-up and winding-off; and (3) generating operating noise by collisions or interference among the cables and the cable reel at starting winding-up and winding-off operations. As discussed above, in the shown embodiment, with two clutch mechanisms 5 and 6 provided on the top and bottom sides of cable mechanism 17, it is prevented that the movable elements of cable mechanism 17 are dragged by rotating motions of steering wheel 1 or steerable wheels 3, 3 during clutch mechanisms 5 and 6 being disengaged. However, it is required to neutralize cable mechanism 17 in some cases. For example, in the case the vehicle is stopped with steerable wheels 3, 3 turned largely in one direction and then is powered OFF by a key switch, clutch mechanisms 5 and 6 are engaged by de-energizing. When the driver turns back steering wheel 1 into the neutral position and turns ON the system power by the key switch, clutch mechanisms 5 and 6 are disengaged. In this state, the wound state of cables 17c and 17d of cable mechanism 17 is far from the neutral condition. If a backup operation is executed with mechanical connection by engaging clutch mechanisms 5 and 6 in this state, steering wheel 1 can be turned to a large maximum steering wheel angle in one direction and can be turned to a small maximum steering wheel angle in the other direction. In summary, without neutralizing cable mechanism 17, a large difference may be produced between left and right maximum steering wheel angles during the backup system being employed. As discussed above, in the shown embodiment, with neutralizing cable mechanism 17, the difference between left and right maximum steering wheel angles during the backup system being employed is reduced with reliability.

The following describes effects produced by the SBW system. (1) A fail-safe steering system for a vehicle comprises a first operating member 9 rotatable with a steering input device 1 of the vehicle, a second operating member 10, a first steering member 14, a second steering member 15, 16 operatively associated with steerable wheels 3 of the vehicle, for steering the steerable wheels 3, a backup mechanism 17 having a portion 17a connected to the second operating member 10 and a portion 17b connected to the first steering member 14, for transmitting torque between the second operating member 10 and the first steering member 14, a first selectively engageable clutch mechanism 5 operatively connectable between the first operating member 9 and the second operating member 10, a second selectively engageable clutch mechanism 6 operatively connectable between the first steering member 14 and the second steering member 15, 16, the backup mechanism 17 comprising a first reel case 17e fixed with reference to a vehicle body of the vehicle, a second reel case 17f fixed with reference to a vehicle body of the vehicle, a first cable reel 17a rotatably supported on the first reel case 17e and connected to the second operating member 10, a second cable reel 17b rotatably supported on the second reel case 17f and connected to the first steering member 10, a first cable 17c wound on the first cable reel 17e in one direction and on the second cable reel 17b in one direction, a second cable 17d wound on the first cable reel 17e in a direction opposite to the direction to wind the first cable 17c and on the second cable reel 17b in a direction opposite to the direction to wind the first cable 17c, a neutralizing section that regulates or keeps a cable wound state of the two cables 17c, 17d in a predetermined neutral condition where differences among amounts of the two cables 17c, 17d each wound on the two cable reels 17a, 17b are smaller than a predetermined length under normal operating conditions of the system, for ensuring desired maximum operable steering states of the first operating member 9 and the second steering member 15, 16 in both directions during backup operations of the system, so that it is prevented with reliability that the movable elements of cable mechanism 17 are dragged by rotating motions of steering wheel 1 or steerable wheels 3, 3 during clutch mechanisms 5 and 6 being disengaged. In addition, the difference between left and right maximum steering wheel angles during the backup system being employed with clutch mechanisms 5 and 6 engaged is reduced with reliability. (2) The fail-safe steering system further comprises a steer-by-wire section for being employed under normal operating conditions of the system comprising sensors 7, 13, 18 for detecting operating states of the vehicle, a feedback torque actuator 8 operatively associated with the first operating member 9 for producing feedback torque based on the operating states, a steering actuator 11 operatively associated with the second steering member 15, 16 for producing steering torque based on the operating states, and a steer-by-wire controller 20 configured to be connected electrically to the sensors 7, 13, 18, the feedback torque actuator 8, the steering actuator 11, the first clutch mechanism 5, and the second clutch mechanism 6, for controlling feedback torque, steering torque, and connection states of the first clutch mechanism 5 and the second clutch mechanism 6, and a cable wound state sensor 19 provided at at least one of the first cable reel 17a and the second cable reel 17b, for detecting the cable wound state, wherein the neutralizing section regulates the cable wound state in the neutral condition under operating conditions of the steer-by-wire section, so that neutralizing the wound state of cables 17c and 17d based on the detection of the cable wound state during the SBW control allows keeping the cable state of cables 17c and 17d in the neutral condition. (3) In the fail-safe steering system, the first cable 17c has one end fixed at one longitudinal end of the first reel case 17e and another end fixed at one longitudinal end of the second reel case 17f, the second cable 17d has one end fixed at another longitudinal end of the first reel case 17e and another end fixed at another longitudinal end of the second reel case 17f, and the cable wound state sensor comprises a contact displacement sensor 19 provided at a side wall of an associated one of the reel cases 17e, 17f, for detecting a cable wound state based on a radial displacement of a contact between the contact displacement sensor 19 and one of an outer peripheral wall of an associated one of the cable reel 17a, 17b and portions of the first cable 17c and the second cable 17d wound on the associated cable reel 17b, so that it is determined whether or not the cable state of cables 17c and 17d is in the neutral condition, with low cost by utilizing a simple switch mechanism. (4) In the fail-safe steering system, the neutralizing section comprises a steer-by-wire control enabling section programmed to enable steer-by-control control when the system is turned on, an initial clutch disengaging section programmed to disengage the first clutch mechanism 5 and the second clutch mechanism 6 after the steer-by-wire control is enabled, a cable wound state determining section programmed to determine whether or not the cable wound state is in the neutral condition based on detected cable wound states, a neutralization driving section programmed to engage the second clutch mechanism 6 and drive the steering actuator 11 based on the operating states of the vehicle when it is determined that the cable wound state is out of the neutral condition, and a clutch disengaging section programmed to disengage the second clutch mechanism 6 when it is determined the cable wound state is in the neutral condition, so that the wound state of cables 17c and 17d is automatically neutralized by steering actuators 11 and 12 without driver's effort.

Figure 5:
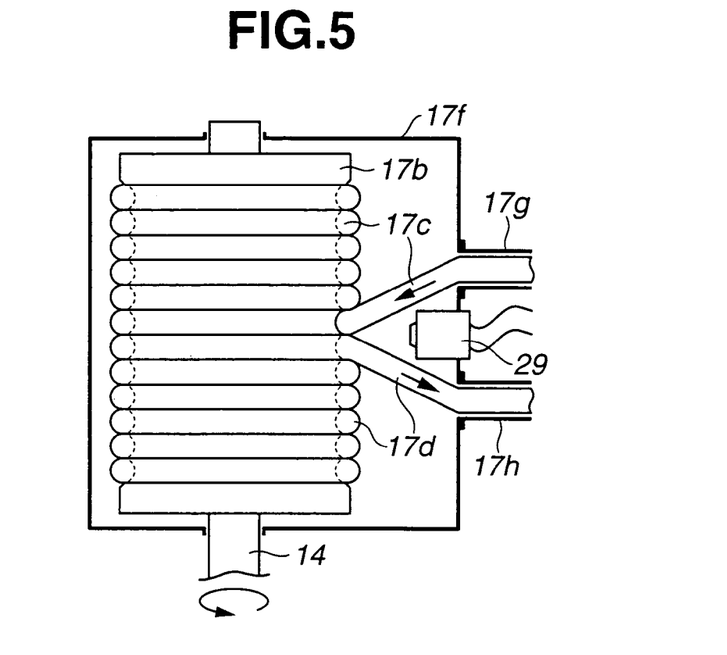
FIG. 5 is a cross-sectional view of a cable mechanism and a non-contact displacement sensor in accordance with a second embodiment of the present invention.

Referring now to FIG. 5, there is shown a part of a steer-by-wire system in accordance with a second embodiment of the present invention. The steer-by-wire system in accordance with the second embodiment is obtained by replacing contact displacement sensor 19 in the steer-by-wire system in accordance with the first embodiment with a non-contact displacement sensor 29. Non-contact displacement sensor 29 is provided at the central position of second cable reel 17b, serving for detecting the wound state of cables 17c and 17d. When amounts of cables 17c and 17d wound on second cable reel 17b are comparable, that is, when the cable wound state is in the neutral condition, non-contact displacement sensor 29 is opposed to the outer peripheral wall of second cable reel 17b that is not covered with the cables. On the other hand, when amounts of cables 17c and 17d wound on second cable reel 17b are different, non-contact displacement sensor 29 is at one of the surfaces of cables 17c and 17d. The surfaces according to the two different cable wound states are stepped by the diameter of cables 17c and 17d. Non-contact displacement sensor 29, such as an optical laser displacement sensor, detects a distance α to an obstacle (the surface of second cable reel 17b). When the distance α is greater than or equal to a predetermined threshold distance β(α≧β), it is determined that the cable wound state is in the neutral condition. On the other hand, when the distance a is smaller than the predetermined threshold distance β(α<β), it is determined that the cable wound state is out of the neutral condition.

The following describes effects produced by the SBW system. In addition to the effects (1), (2), and (4) as discussed in the first embodiment, the following effects are produced. (5) In the fail-safe steering system, the first cable 17c has one end fixed at one longitudinal end of the first reel case 17e and another end fixed at one longitudinal end of the second reel case 17f, the second cable 17d has one end fixed at another longitudinal end of the first reel case 17e and another end fixed at another longitudinal end of the second reel case 17f, and the cable wound state sensor comprises a non-contact displacement sensor 29 provided at a side wall of an associated one of the reel cases 17e, 17f, for detecting a cable wound state based on a radial displacement of one of an outer peripheral wall of an associated one of the cable reels 17a, 17b and portions of the first cable 17c and the second cable 17d wound on the associated cable reel 17a; 17b that is opposite to the non-contact displacement sensor 29, so that it is determined whether or not the wound state of cables 17c and 17d is in the neutral condition, without contact damages in second reel case 17f.

Figure 6:
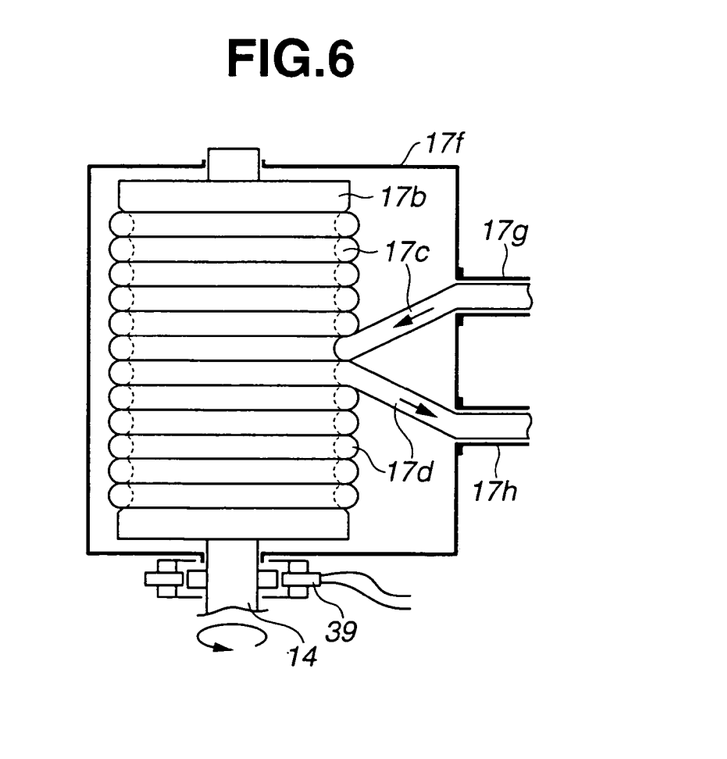
FIG. 6 is a cross-sectional view of a cable mechanism and an angular displacement sensor in accordance with a third embodiment of the present invention.

Referring now to FIG. 6, there is shown a part of a steer-by-wire system in accordance with a third embodiment of the present invention. The steer-by-wire system in accordance with the third embodiment is obtained by replacing contact displacement sensor 19 in the steer-by-wire system in accordance with the first embodiment with an angular displacement sensor 39. Angular displacement sensor 39 is provided at the outer peripheral wall of first pinion shaft 14, serving for detecting the wound state of cables 17c and 17d. Angular displacement sensor 39, such as an angular resolver, detects an angular displacement θ of first pinion shaft 14. If first pinion shaft 14 rotates over one turn, angular displacement θ indicates an integrating angular displacement. When the angular displacement θ is smaller than or equal to a predetermined threshold angle ε (−ε≦θ≦ε), it is determined that the cable wound state is in the neutral condition. On the other hand, when the absolute value of the angular displacement θ is greater than the predetermined threshold angle ε (θ>ε or θ<−ε), it is determined that the cable wound state is out of the neutral condition.

The following describes effects produced by the SBW system. In addition to the effects (1), (2), and (4) as discussed in the first embodiment, the following effects are produced. (6) In the fail-safe steering system, the cable wound state sensor comprises an angular displacement sensor 39 detecting the cable wound state based on an angular displacement of an associated one of the cable reels 17a, 17b, so that it is precisely determined by detecting angular displacements directly whether or not the wound state of cables 17c and 17d is in the neutral condition.

Figure 7:
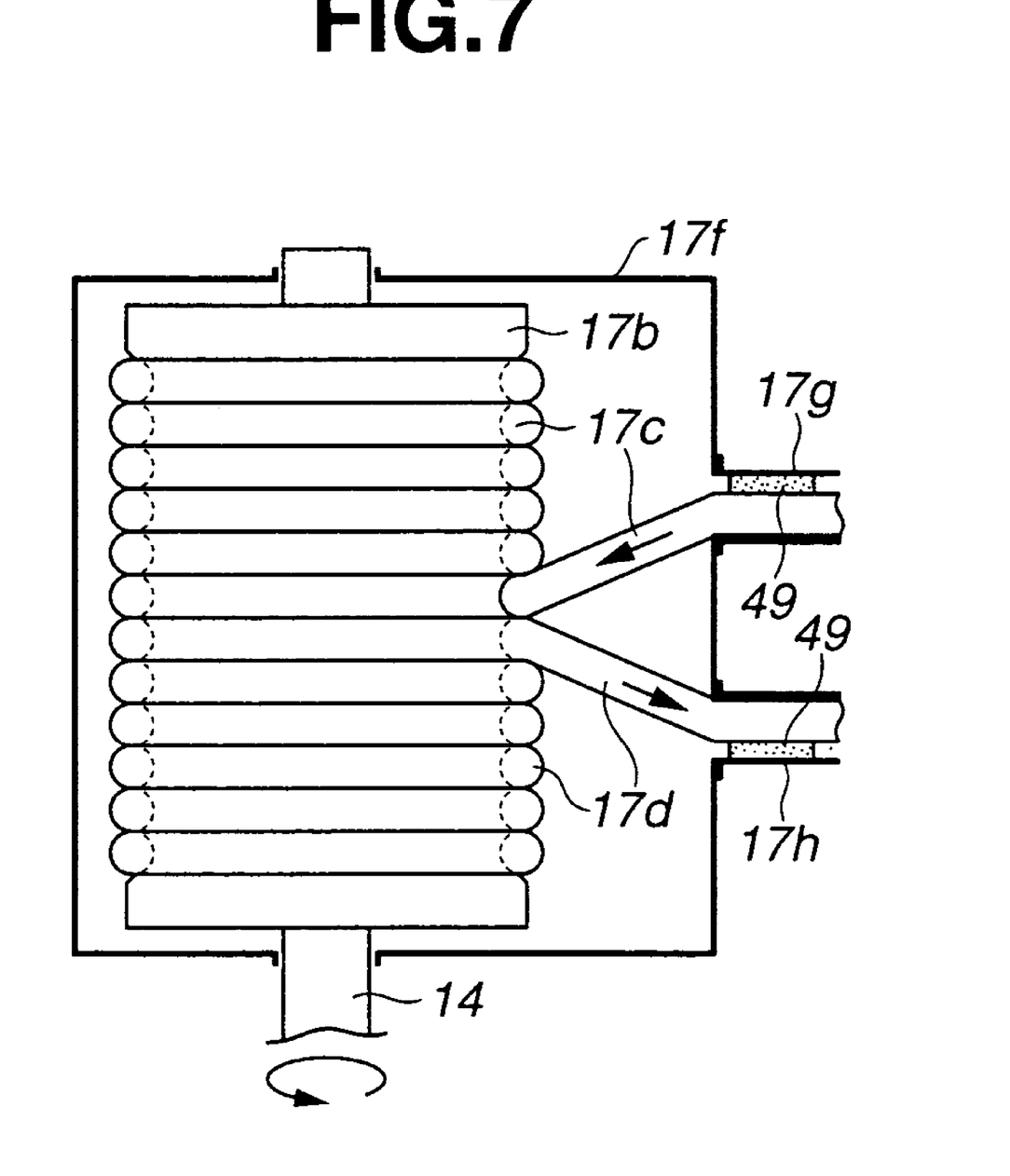
FIG. 7 is a cross-sectional view of a cable mechanism and a force sensor in accordance with a fourth embodiment of the present invention.

Referring now to FIG. 7, there is shown a part of a steer-by-wire system in accordance with a fourth embodiment of the present invention. The steer-by-wire system in accordance with the fourth embodiment is obtained by replacing contact displacement sensor 19 in the steer-by-wire system in accordance with the first embodiment with a force sensor 49. Force sensors 49, 49 are provided at a contact between first cable 17c and first cable outer tube 17g and at a contact between second cable 17d and second cable outer tube 17h, serving for detecting the wound state of cables 17c and 17d. When amounts of cables 17c and 17d wound on second cable reel 17b are comparable, that is, when the cable wound state is in the neutral condition, forces imposed on the contact between first cable 17c and first cable outer tube 17g and the contact between second cable 17d and second cable outer tube 17h are comparable. On the other hand, when amounts of cables 17c and 17d wound on second cable reel 17b are different, forces imposed on the contact between first cable 17c and first cable outer tube 17g and the contact between second cable 17d and second cable outer tube 17h are different. Force sensor 49, such as a pressure sensitive conductive rubber, detects two forces F1 and F2 each imposed on a contact point of first cable 17c and first cable outer tube 17g or second cable 17d and second cable outer tube 17h. When the absolute value of the difference between forces F1 and F2 is smaller than or equal to a predetermined threshold force δ (|F1−F2|≦δ), it is determined that the cable wound state is in the neutral condition. On the other hand, when the absolute value of the difference between forces F1 and F2 is greater than the predetermined threshold force δ (|F1−F2|>δ), it is determined that the cable wound state is out of the neutral condition.

The following describes effects produced by the SBW system. In addition to the effects (1), (2), and (4) as discussed in the first embodiment, the following effects are produced. (7) In the fail-safe steering system, the backup mechanism 17 further comprises a first cable outer tube 17g having one end attached to a side wall of the first reel case 17e and another end attached to a side wall of the second reel case 17f, and a second cable outer tube 17h having one end attached to the side wall of the first reel case 17e and another end attached to the side wall of the second reel case 17f, the first cable 17c is inserted into the first cable outer tube 17g and has one end fixed at one longitudinal end of the first reel case 17e and another end fixed at one longitudinal end of the second reel case 17f, the second cable 17d is inserted into the second cable outer tube 17h and has one end fixed at another longitudinal end of the first reel case 17e and another end fixed at another longitudinal end of the second reel case 17f, and the cable wound state sensor comprises a force sensor 49 detecting a cable wound state based on a difference between pressures imposed on a contact between the first cable 17c and the first cable outer tube 17g and a contact between the second cable 17d and the second cable outer tube 17h, so that it is determined by employing a force sensor whether or not the wound state of cables 17c and 17d is in the neutral condition, which results in a compact structure of the system.

Figure 8:
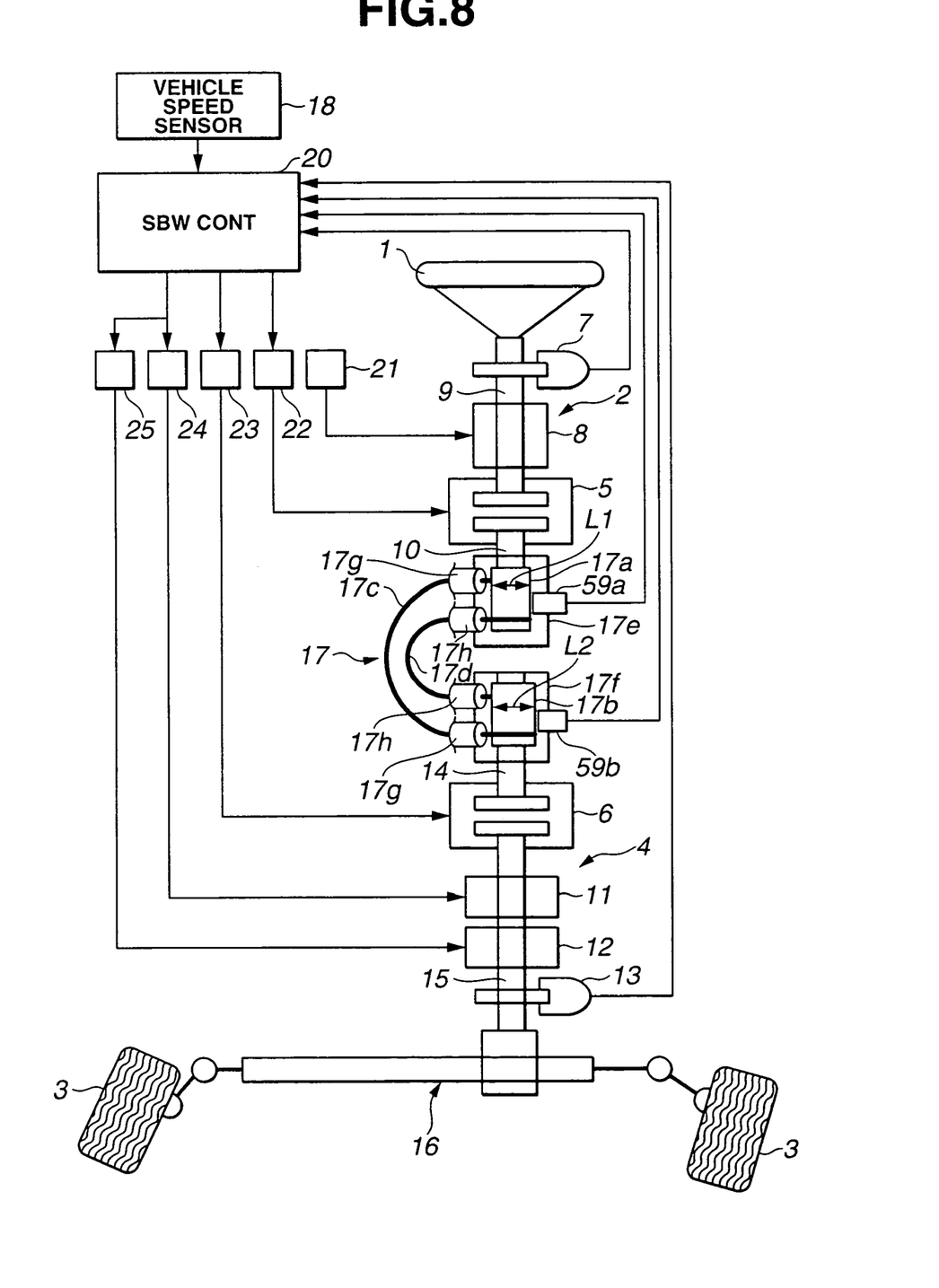
FIG. 8 is a block diagram depicting a fail-safe steer-by-wire system for a vehicle in accordance with a fifth embodiment of the present invention.
Figure 9A:
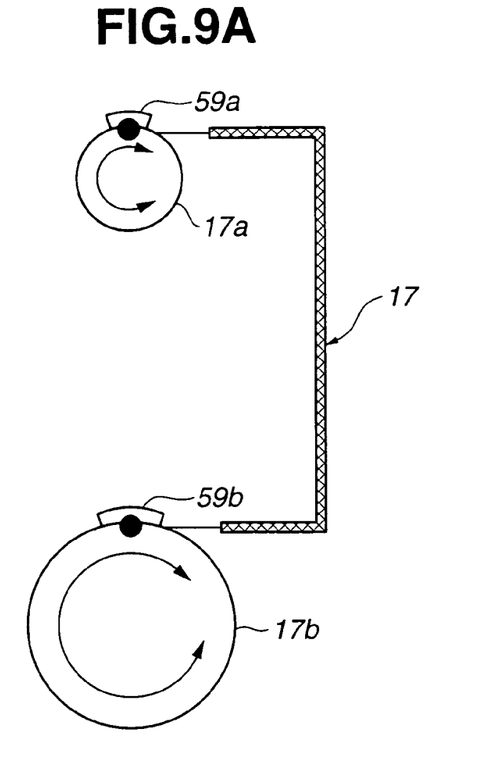
FIG. 9A is a schematic diagram depicting operations of a first neutral position sensor and a second neutral position sensor in accordance with the fifth embodiment.
Figure 9B:
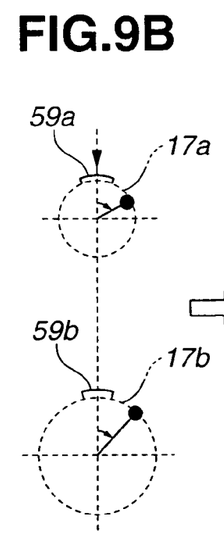
FIG. 9B is a schematic diagram depicting an operating state of the first neutral position sensor and the second neutral position sensor in accordance with the fifth embodiment.
Figure 9C:
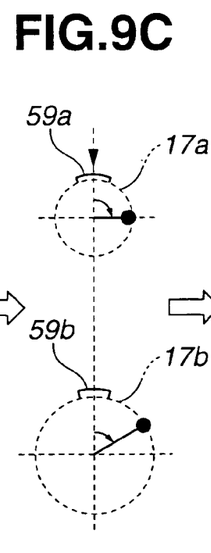
FIG. 9C is a schematic diagram depicting an operating state of the first neutral position sensor and the second neutral position sensor in accordance with the fifth embodiment.
Figure 9D:
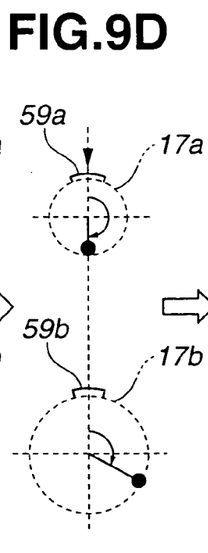
FIG. 9D is a schematic diagram depicting an operating state of the first neutral position sensor and the second neutral position sensor in accordance with the fifth embodiment.
Figure 9E:
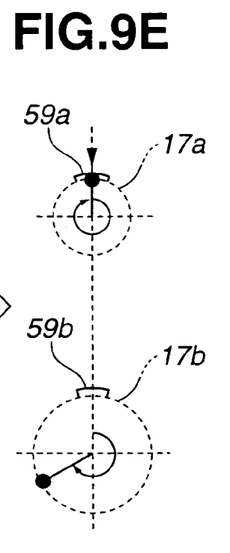
FIG. 9E is a schematic diagram depicting an operating state of the first neutral position sensor and the second neutral position sensor in accordance with the fifth embodiment.

Referring now to FIG. 8, there is shown a steer-by-wire system in accordance with a fifth embodiment of the present invention. The steer-by-wire system in accordance with the fifth embodiment is obtained by setting a first reel diameter L1 of first cable reel 17a and a second reel diameter L2 of second cable reel 17b to different values and replacing contact displacement sensor 19 in the steer-by-wire system in accordance with the first embodiment with a first neutral position sensor 59a at first cable reel 17a and a second neutral position sensor 59b at second cable reel 17b. In the shown embodiment, first reel diameter L1 is greater than second reel diameter L2. The different reel diameters indicate different rotation speeds and angular displacements of cable reels 17a and 17b. Utilizing this characteristic, the cable wound state is determined by detecting two different angular displacements of cable reels 17a and 17b. Referring now to FIGS. 9A through 9E, there are shown operating states of cable reels 17a and 17b. FIG. 9A shows the neutral condition of the cable wound state. When the cable wound state is in the condition as shown in FIG. 9A, that is, both cables are in the neutral position, it is determined that the cable wound state is in the neutral condition. With steering wheel 1 turned to rotate first cable reel 17a, the operating state varies from the neutral condition to FIGS. 9B through 9D where the angular displacements of cable reels 17a and 17b are different. Therefore, when the angular displacements of cable reels 17a and 17b are different as shown in FIGS. 9B through 9D, it is determined that the cable wound state is out of the neutral condition. In an operating state as shown in FIG. 9E, first cable reel 17a has the same angular displacement as the neutral condition. However, the angular displacement of second cable reel 17b is different from that in the neutral condition, so that it is determined that the cable wound state is out of the neutral condition.

The following describes effects produced by the SBW system. In addition to the effects (1), (2), and (4) as discussed in the first embodiment, the following effects are produced. (8) In the fail-safe steering system, the first cable reel 17a and the second cable reel 17b are different in outside diameter, the cable wound state sensor comprises a first neutral position sensor 59a provided at the first reel case 17e for detecting a cable wound state based on an operating state of the first cable reel 17a and a second neutral position sensor 59b provided at the second reel case 17f for detecting a cable wound state based on an operating state of the second cable reel 17b, and the neutralizing section finally determines that the cable wound state is in the neutral condition when it is determined by both the first neutral position sensor 59a and the second neutral position sensor 59b that the cable wound state is in the neutral condition, so that it is precisely determined whether or not the wound state of cables 17c and 17d is in the neutral condition based on the angular displacements of cable reels 17a and 17b.

In the shown embodiment, reel diameters L1 and L2 are determined so that first cable reel 17a and second cable reel 17b have a same angular displacement only in the neutral condition. For, example, even when second cable reel 17b rotates one turn or 360 degrees from the neutral position, first cable reel 17a has an angular displacement different from that in the neutral condition.

Figure 10:
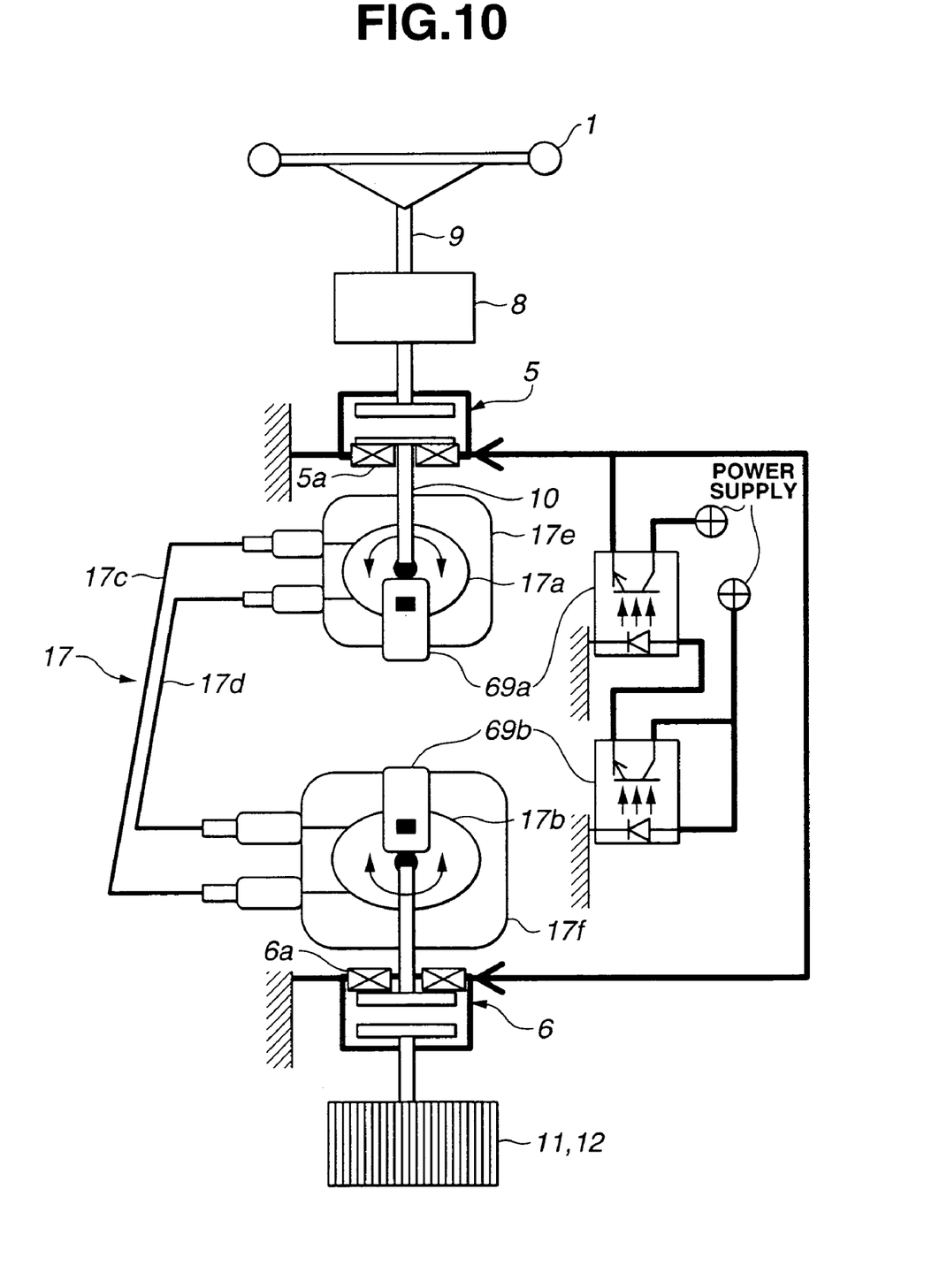
FIG. 10 is a block diagram depicting a major part of a fail-safe steer-by-wire system for a vehicle in accordance with a sixth embodiment of the present invention.

Referring now to FIG. 10, there is shown a steer-by-wire system in accordance with a sixth embodiment of the present invention. The SBW system includes non-contact neutral position sensing switches as a neutral position sensor, and intervenes the non-contact neutral position sensing switches between the system power supply and the solenoids of clutch mechanisms 5 and 6, for simply and automatically disengaging clutch mechanisms 5 and 6 during the cable wound state being in the neutral condition. The non-contact neutral position sensing switch includes a photodiode and a phototransistor opposed to each other sandwiching a cable reel in which a slit is provided for the pair of the photodiode and the phototransistor. Thus, a first non-contact neutral position sensing switch 69a provided at first reel case 17e and a second non-contact neutral position sensing switch 69b provided at second reel case 17f connect the circuit (or are turned ON), when the wound state of cable reels 17a and 17b are in the neutral condition. When at least one of first non-contact neutral position sensing switch 69a and nbn-contact neutral position sensing switch 69b is turned OFF after the system power being turned on, solenoids 5a and 6a are de-energized, so that clutch mechanisms 5 and 6 remains engaged. On the other hand, when first non-contact neutral position sensing switch 69a and second non-contact neutral position sensing switch 69b are both turned ON, solenoids 5a and 6a are energized, so that clutch mechanisms 5 and 6 disengaged. This operation also serves for detecting the cable wound state. Actually, when first non-contact neutral position sensing switch 69a and second non-contact neutral position sensing switch 69b are both turned ON, the photodiode of second non-contact neutral position sensing switch 69b attached to second cable reel 17b brings the phototransistor into conduction. The conduction of the phototransistor of second non-contact neutral position sensing switch 69b energizes the photodiode of first non-contact neutral position sensing switch 69a attached to first cable reel 17a, bringing the phototransistor of first non-contact neutral position sensing switch 69a into conduction. The conduction of phototransistor of first non-contact neutral position sensing switch 69a, which is electrically connected to the power supply, results in disengaging clutch mechanisms 5 and 6.

The following describes effects produced by the SBW system. In addition to the effects (1) and (2), as discussed in the first embodiment, and the effect (8), as discussed in the fifth embodiment, the following effects are produced. (9) In the fail-safe steering system, the first neutral position sensor comprises a first neutral position sensing switch 69a being on during detected cable wound states being in the neutral condition and being off during detected cable wound states being out of the neutral condition, the second neutral position sensor comprises a second neutral position sensing switch 69b being on during detected cable wound states being in the neutral condition and being off during detected cable wound states being out of the neutral condition, the neutralizing section comprises an electric circuit configured to de-energize the clutch mechanisms 5, 6 to engage the clutch mechanisms 5, 6 during at least one of the first neutral position sensing switch 69a and the second neutral position sensing switch 69b being off and to energize the clutch mechanisms 5, 6 to disengage the clutch mechanisms 5, 6 during both of the first neutral position sensing switch 69a and the second neutral position sensing switch 69b being on, the first neutral position sensing switch is a first non-contact neutral position sensing switch 69a, and the second neutral position sensing switch is a second non-contact neutral position sensing switch 69b, so that the function of detecting the cable wound state and the function of disengaging clutch mechanisms 5 and 6 are served by employing a simple switch circuit.

Figure 11:
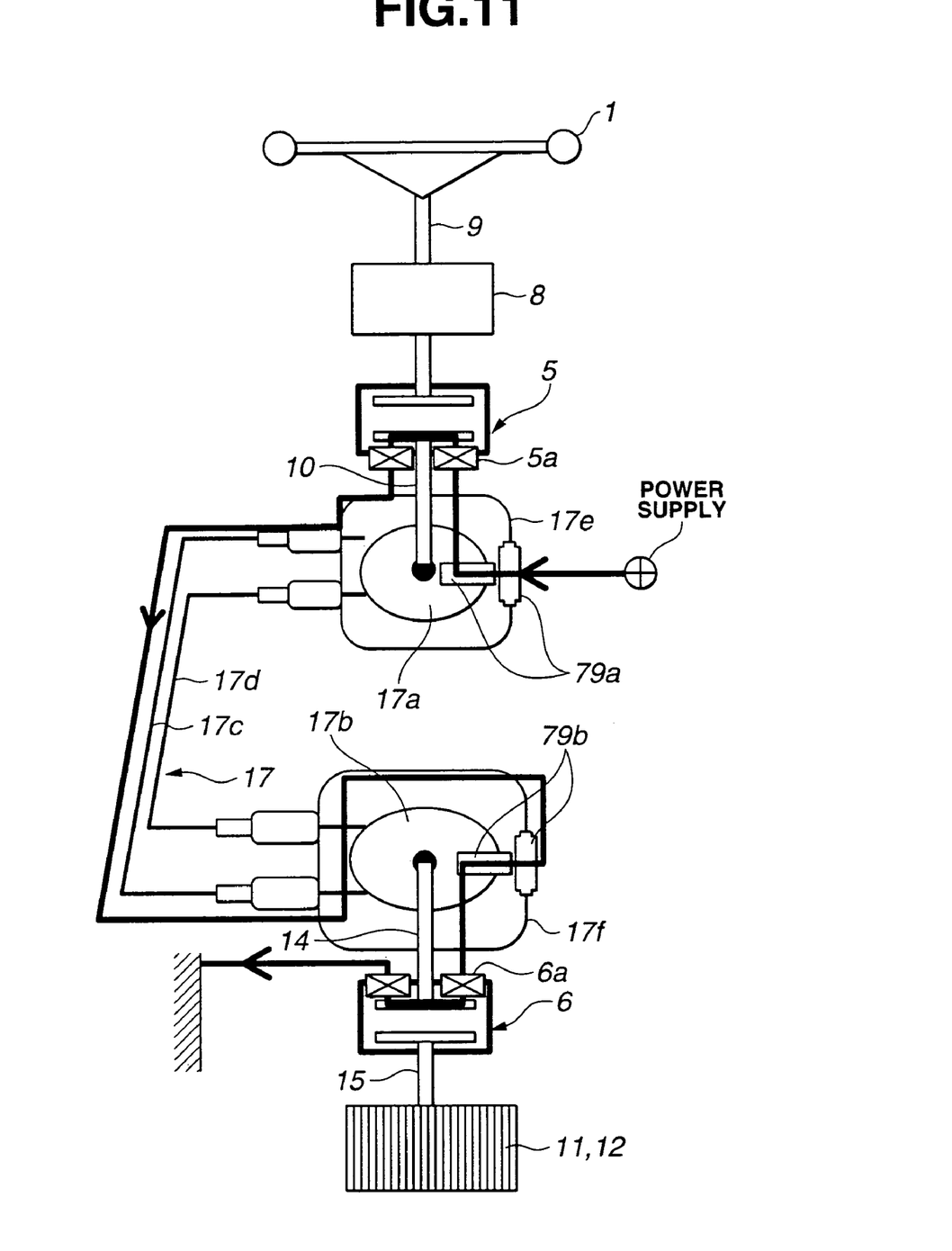
FIG. 11 is a block diagram depicting a major part of a fail-safe steer-by-wire system for a vehicle in accordance with a seventh embodiment of the present invention.

Referring now to FIG. 11, there is shown a steer-by-wire system in accordance with a seventh embodiment of the present invention. The SBW system includes contact neutral position sensing switches as a neutral position sensor, and intervenes the non-contact neutral position sensing switches between the system power supply and the solenoids of clutch mechanisms 5 and 6, for simply and automatically disengaging clutch mechanisms 5 and 6 during the cable wound state being in the neutral condition. The contact neutral position sensing switch includes a conductive terminal provided at a cable reel and a conductive terminal provided at a reel case. Thus, a first contact neutral position sensing switch 79a provided at first reel case 17e and a second contact neutral position sensing switch 79b provided at second reel case 17f connect the circuit, when the wound state of cable reels 17a and 17b are in the neutral condition. When at least one of first contact neutral position sensing switch 79a and second contact neutral position sensing switch 79b is turned OFF after the system power being turned on, solenoids 5a and 6a are de-energized, so that clutch mechanisms 5 and 6 remains engaged. On the other hand, when first contact neutral position sensing switch 79a and second contact neutral position sensing switch 79b are both turned ON, solenoids 5a and 6a are energized, so that clutch mechanisms 5 and 6 disengaged. This operation also serves for detecting the cable wound state. Actually, when first contact neutral position sensing switch 79a and second contact neutral position sensing switch 79b are both turned ON, the electric current flows from the power supply in sequence to first contact neutral position sensing switch 79a, solenoid 5a, second contact neutral position sensing switch 79b, solenoid 6a, and the ground. Energizing solenoids 5a and 6a disengages clutch mechanisms 5 and 6.

In the sixth and seventh embodiments, the electric circuit includes both solenoids 5a and 6a of clutch mechanisms 5 and 6.

The following describes effects produced by the SBW system. In addition to the effects (1) and (2), as discussed in the first embodiment, and the effect (8), as discussed in the fifth embodiment, the following effects are produced. (10) In the fail-safe steering system, the first neutral position sensor comprises a first neutral position sensing switch 69a being on during detected cable wound states being in the neutral condition and being off during detected cable wound states being out of the neutral condition, the second neutral position sensor comprises a second neutral position sensing switch 69b being on during detected cable wound states being in the neutral condition and being off during detected cable wound states being out of the neutral condition, the neutralizing section comprises an electric circuit configured to de-energize the clutch mechanisms 5, 6 to engage the clutch mechanisms 5, 6 during at least one of the first neutral position sensing switch 69a and the second neutral position sensing switch 69b being off and to energize the clutch mechanisms 5, 6 to disengage the clutch mechanisms 5, 6 during both of the first neutral position sensing switch 69a and the second neutral position sensing switch 69b being on, the first neutral position sensing switch is a first contact neutral position sensing switch 79a, and the second neutral position sensing switch is a second contact neutral position sensing switch 79b, so that the function of detecting the cable wound state and the function of disengaging clutch mechanisms 5 and 6 are served by employing a simple switch circuit with a contact switch for reducing cost.

As discussed above, in the shown embodiments, the SBW system includes two redundant steering actuators to have a fail-safe function. Alternatively, the steering system may be a combination of a SBW system (with a feedback torque actuator and a steering actuator) and a hydraulic power steering system. Alternatively, the steering system may be a combination of a SBW system (with a feedback torque actuator and a steering actuator) and an electrical power steering system. In these alternative steering systems, when there is a failure in the SBW system, the hydraulic power steering system or the electrical power steering system provides assist torque only by engaging clutch mechanisms. This reduces the need for redundant steering actuators, so that the number of steering actuators may be decreased.

In the shown embodiments, the operation of neutralizing the cable wound state is executed by the steer-by-wire controller in traveling or standing still during the SBW control. Alternatively, the operation of neutralizing the cable wound state may be executed at an initializing phase before the SBW control is initiated by the steer-by-wire controller.

In the shown embodiments, steer-by-wire controller 20 engages second clutch mechanism 6 for neutralizing the cable wound state, when it is determined that the cable wound state is out of the neutral condition during operating conditions of the SBW system. In addition, second clutch mechanism 6 may be disengaged temporarily during the cable wound state varying in a direction to increase deviation from the neutral condition according to driver's manual operation. In that case, smaller margins are enough for the lengths of the cables.

In some of the shown embodiments, second clutch mechanism 6 is operated for neutralizing the cable wound state. Alternatively or additionally, first clutch mechanism 5 may be operated for neutralizing the cable wound state. With this operation, it is possible to neutralize the cable wound state, even during failures being present in both the steering actuators 11 and 12.

The entire contents of Japanese Patent Application No. 2003-166412 (filed Jun. 11, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fail-safe steering system for a vehicle comprising:
   a first operating member rotatable with a steering input device of the vehicle;
   a second operating member;
   a first steering member;
   a second steering member operatively associated with steerable wheels of the vehicle, for steering the steerable wheels;
   a backup mechanism having a portion connected to the second operating member and a portion connected to the first steering member, for transmitting torque between the second operating member and the first steering member;
   a first selectively engageable clutch mechanism operatively connectable between the first operating member and the second operating member; and
   a second selectively engageable clutch mechanism operatively connectable between the first steering member and the second steering member.

2. The fail-safe steering system as claimed in claim 1, wherein the backup mechanism comprises:
   a first reel case fixed with reference to a vehicle body of the vehicle;
   a second reel case fixed with reference to a vehicle body of the vehicle;
   a first cable reel rotatably supported on the first reel case and connected to the second operating member;
   a second cable reel rotatably supported on the second reel case and connected to the first steering member;
   a first cable wound on the first cable reel in one direction and on the second cable reel in one direction; and
   a second cable wound on the first cable reel in a direction opposite to the direction to wind the first cable and on the second cable reel in a direction opposite to the direction to wind the first cable.

3. The fail-safe steering system as claimed in claim 2 further comprising:
   a neutralizing section that regulates a cable wound state of the two cables in a predetermined neutral condition where differences among amounts of the two cables each wound on the two cable reels are smaller than a predetermined length under normal operating conditions of the system, for ensuring desired maximum operable steering states of the first operating member and the second steering member in both directions during backup operations of the system.

4. The fail-safe steering system as claimed in claim 3 further comprising:
a steer-by-wire section for being employed under normal operating conditions of the system comprising:
sensors for detecting operating states of the vehicle;
a feedback torque actuator operatively associated with the first operating member for producing feedback torque based on the operating states;
a steering actuator operatively associated with the second steering member for producing steering torque based on the operating states; and
a steer-by-wire controller configured to be connected electrically to the sensors, the feedback torque actuator, the steering actuator, the first clutch mechanism, and the second clutch mechanism, for controlling feedback torque, steering torque, and connection states of the first clutch mechanism and the second clutch mechanism; and
a cable wound state sensor provided at at least one of the first cable reel and the second cable reel, for detecting the cable wound state;
wherein the neutralizing section regulates the cable wound state in the neutral condition under operating conditions of the steer-by-wire section.

5. The fail-safe steering system as claimed in claim 4, wherein the neutralizing section comprises:
a steer-by-wire control enabling section programmed to enable steer-by-control control when the system is turned on;
an initial clutch disengaging section programmed to disengage the first clutch mechanism and the second clutch mechanism after the steer-by-wire control is enabled;
a cable wound state determining section programmed to determine whether or not the cable wound state is in the neutral condition based on detected cable wound states;
a neutralization driving section programmed to engage the second clutch mechanism and drive the steering actuator based on the operating states of the vehicle when it is determined that the cable wound state is out of the neutral condition; and
a clutch disengaging section programmed to disengage the second clutch mechanism when it is determined the cable wound state is in the neutral condition.

6. The fail-safe steering system as claimed in claim 5, wherein the neutralization driving section programmed to disengage the second clutch mechanism temporarily during the cable wound state varying in a direction to increase deviation from the neutral condition.

7. The fail-safe steering system as claimed in claim 4, wherein the neutralizing section comprises:
a steer-by-wire control enabling section programmed to enable steer-by-control control when the system is turned on;
an initial clutch disengaging section programmed to disengage the first clutch mechanism and the second clutch mechanism after the steer-by-wire control is enabled;
a cable wound state determining section programmed to determine whether or not the cable wound state is in the neutral condition based on detected cable wound states;
a neutralization driving section programmed to engage the first clutch mechanism and drive the steering actuator based on the operating states of the vehicle when it is determined that the cable wound state is out of the neutral condition;
a clutch disengaging section programmed to disengage the first clutch mechanism when it is determined the cable wound state is in the neutral condition.

8. The fail-safe steering system as claimed in claim 4, wherein:
the first cable has one end fixed at one longitudinal end of the first reel case and another end fixed at one longitudinal end of the second reel case;
the second cable has one end fixed at another longitudinal end of the first reel case and another end fixed at another longitudinal end of the second reel case; and
the cable wound state sensor comprises a contact displacement sensor provided at a side wall of an associated one of the reel cases, for detecting a cable wound state based on a radial displacement of a contact between the contact displacement sensor and one of an outer peripheral wall of an associated one of the cable reel and portions of the first cable and the second cable wound on the associated cable reel.

9. The fail-safe steering system as claimed in claim 4, wherein:
the first cable has one end fixed at one longitudinal end of the first reel case and another end fixed at one longitudinal end of the second reel case;
the second cable has one end fixed at another longitudinal end of the first reel case and another end fixed at another longitudinal end of the second reel case; and
the cable wound state sensor comprises a non-contact displacement sensor provided at a side wall of an associated one of the reel cases, for detecting a cable wound state based on a radial displacement of one of an outer peripheral wall of an associated one of the cable reels and portions of the first cable and the second cable wound on the associated cable reel that is opposite to the non-contact displacement sensor.

10. The fail-safe steering system as claimed in claim 4, wherein the cable wound state sensor comprises an angular displacement sensor detecting the cable wound state based on an angular displacement of an associated one of the cable reels.

11. The fail-safe steering system as claimed in claim 4, wherein:
the backup mechanism further comprises:
a first cable outer tube having one end attached to a side wall of the first reel case and another end attached to a side wall of the second reel case; and
a second cable outer tube having one end attached to the side wall of the first reel case and another end attached to the side wall of the second reel case;
the first cable is inserted into the first cable outer tube and has one end fixed at one longitudinal end of the first reel case and another end fixed at one longitudinal end of the second reel case;
the second cable is inserted into the second cable outer tube and has one end fixed at another longitudinal end of the first reel case and another end fixed at another longitudinal end of the second reel case; and
the cable wound state sensor comprises a force sensor detecting a cable wound state based on a difference between pressures imposed on a contact between the first cable and the first cable outer tube and a contact between the second cable and the second cable outer tube.

12. The fail-safe steering system as claimed in claim 4, wherein:
- the first cable reel and the second cable reel are different in outside diameter;
- the cable wound state sensor comprises a first neutral position sensor provided at the first reel case for detecting a cable wound state based on an operating state of the first cable reel and a second neutral position sensor provided at the second reel case for detecting a cable wound state based on an operating state of the second cable reel; and
- the neutralizing section finally determines that the cable wound state is in the neutral condition when it is determined by both the first neutral position sensor and the second neutral position sensor that the cable wound state is in the neutral condition.

13. The fail-safe steering system as claimed in claim 12, wherein:
- the first neutral position sensor comprises a first neutral position sensing switch being on during detected cable wound states being in the neutral condition and being off during detected cable wound states being out of the neutral condition;
- the second neutral position sensor comprises a second neutral position sensing switch being on during detected cable wound states being in the neutral condition and being off during detected cable wound states being out of the neutral condition; and
- the neutralizing section comprises an electric circuit configured to de-energize the clutch mechanisms to engage the clutch mechanisms during at least one of the first neutral position sensing switch and the second neutral position sensing switch being off and to energize the clutch mechanisms to disengage the clutch mechanisms during both of the first neutral position sensing switch and the second neutral position sensing switch being on.

14. The fail-safe steering system as claimed in claim 13, wherein:
- the first neutral position sensing switch is a first non-contact neutral position sensing switch; and
- the second neutral position sensing switch is a second non-contact neutral position sensing switch.

15. The fail-safe steering system as claimed in claim 13, wherein:
- the first neutral position sensing switch is a first contact neutral position sensing switch; and
- the second neutral position sensing switch is a second contact neutral position sensing switch.

16. The fail-safe steering system as claimed in claim 13, wherein the steer-by-wire controller de-energizes the electric circuit to engage the clutch mechanisms during backup operations of the system, independently of operating states of the neutral position sensors.

17. A fail-safe steering system for a vehicle comprising:
- first operating means for receiving and transmitting steering wheel torque;
- second operating means for transmitting torque;
- first steering means for transmitting torque;
- second steering means for steering steerable wheels of the vehicle;
- backup means for drivingly connecting the second operating means and the first steering means;
- first torque-transmitting means for selectively and operatively connecting and disconnecting the first operating means and the second operating means; and
- second torque-transmitting means for selectively and operatively connecting and disconnecting the first steering means and the second steering means.

18. A method of controlling a fail-safe steering system comprising a first operating member rotatable with a steering input device of the vehicle, a second operating member, a first steering member, a second steering member operatively associated with steerable wheels of the vehicle, for steering the steerable wheels, a backup mechanism having a portion connected to the second operating member and a portion connected to the first steering member, for transmitting torque between the second operating member and the first steering member, a first selectively engageable clutch mechanism operatively connectable between the first operating member and the second operating member, and a second selectively engageable clutch mechanism operatively connectable between the first steering member and the second steering member, the method comprising:
- enabling steer-by-control control when the system is turned on;
- disengaging the first clutch mechanism and the second clutch mechanism after the steer-by-wire control is enabled;
- determining whether or not an operating state of the backup mechanism is in a predetermined neutral condition; and
- engaging the second clutch mechanism and steering the steerable wheels based on the operating states of the vehicle when it is determined that the operating state of the backup mechanism is within the predetermined neutral condition.

* * * * *